(12) United States Patent
Yanada et al.

(10) Patent No.: US 6,427,044 B1
(45) Date of Patent: Jul. 30, 2002

(54) OPTICAL FIBER

(75) Inventors: Eiji Yanada; Yuichi Ohga; Masashi Onishi, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 231 days.

(21) Appl. No.: 09/585,337

(22) Filed: Jun. 2, 2000

(30) Foreign Application Priority Data

Jun. 23, 1999 (JP) .............................. 11-176794

(51) Int. Cl.$^7$ ................................. G02B 6/22
(52) U.S. Cl. ................ 385/128; 385/123; 385/126; 385/127
(58) Field of Search ................ 385/123, 126, 385/127, 128

(56) References Cited

FOREIGN PATENT DOCUMENTS

| JP | 8-59278 | 3/1996 |
| JP | 8-295528 | 11/1996 |
| JP | 9-127354 | 5/1997 |

OTHER PUBLICATIONS

Hybrid Transmission Lines Composed of PSCP and DCF Nov. 26, 1999.
1999 Rosc Symposium "Massive WDM and TDM Soliton Transmission Systems" 11/09 thru Nov. 12, 1999 in Kyoto.

*Primary Examiner*—Rodney Bovernick
*Assistant Examiner*—Sung Pak
(74) *Attorney, Agent, or Firm*—McDermott, Will & Emery

(57) ABSTRACT

The present invention relates to an optical fiber comprising a structure which yields a low optical transmission loss even when doped with a high concentration of Ge element and is excellent in reliability for strength. The optical fiber according to the present invention comprises a core region whose maximum value $\Delta max$ of relative refractive index difference with respect to silica glass non-intentionally doped with impurities is 0.8% or more, in its diameter direction, a cladding region comprising silica glass non-intentionally doped with impurities or silica glass doped with a predetermined amount of fluorine, and a hermetic coat mainly composed of carbon. In particular, the transmission loss $\alpha$ at a wavelength of 1.55 $\mu$m and the maximum value $\Delta max$ satisfy the relationship of:

$$\alpha \leq 0.131 \times (\Delta max)^2 - 0.214 \times (\Delta max) + 0.284$$

in the optical fiber according to the present invention.

17 Claims, 13 Drawing Sheets

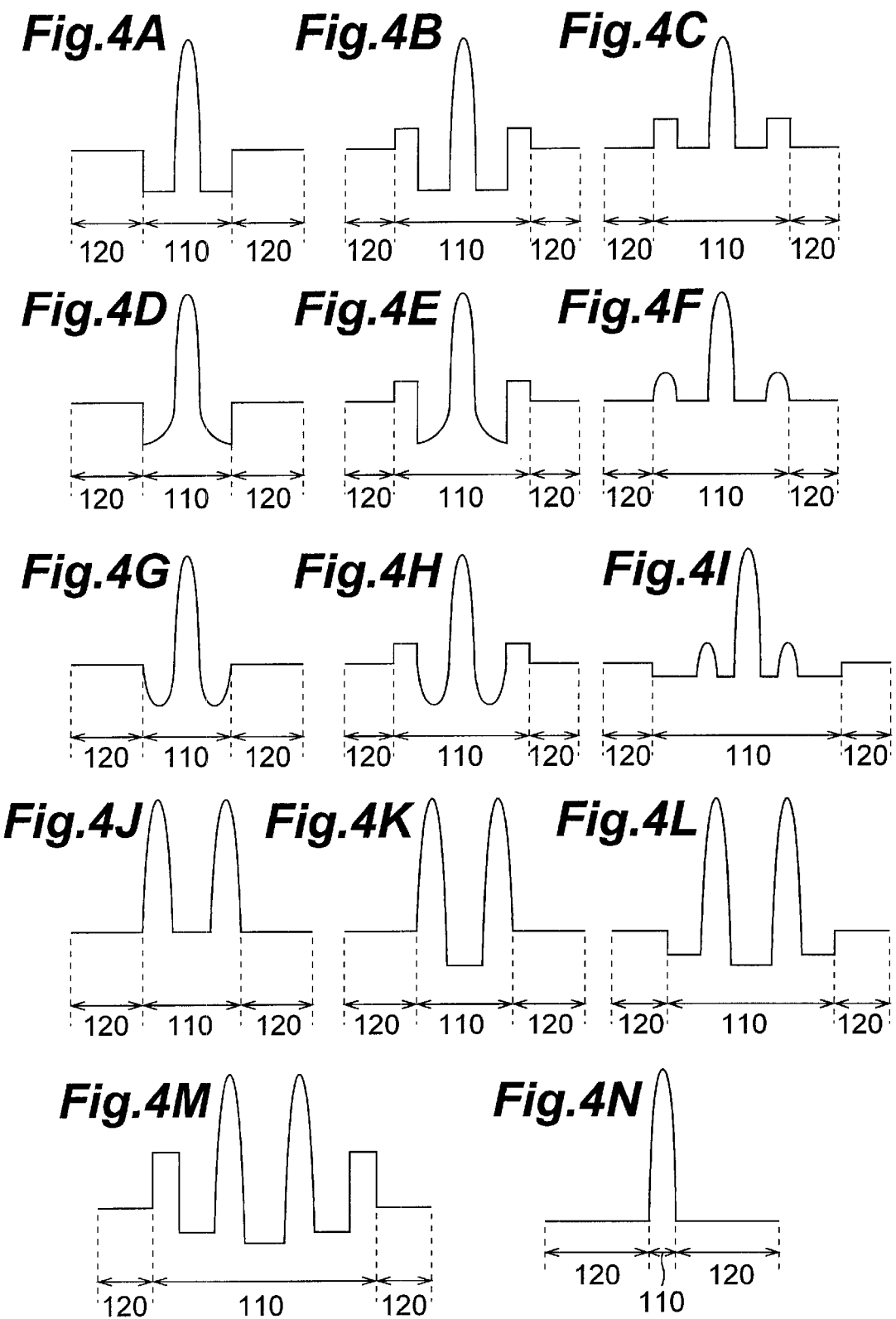

OPTICAL FIBER

BACKGROUND OF THE INVENTION

1. Field of the Invention

The present invention relates to an optical fiber employable as a transmission line in optical communication systems.

2. Related Background Art

Usually, an optical fiber is made by drawing one end of an optical fiber preform comprising a plurality of regions with refractive indices different from each other while heating it. In a typical conventional drawing step, while the optical fiber preform is in a held state, it is heated and, at the same time, tension is applied in the gravity direction to its part softened upon heating. As one end of the optical fiber preform softened upon heating is drawn until a desirable fiber diameter is attained due to the application of tension in the gravity direction, an optical fiber is obtained.

For example, Japanese Patent Application Laid-Open No. HEI 9-127354 discloses a dispersion compensating optical fiber whose core is doped with a high concentration of $GeO_2$, while stating that, when the optical fiber doped with such a high concentration of $GeO_2$ is drawn, a tension of 5 to 16 $kg/mm^2$ is added to its preform. In general, while an optical fiber yields a lower transmission loss as the drawing tension is greater, there is a possibility of increases in tension causing the optical fiber to break. Therefore, the above-mentioned publication indicates 5 to 16 $kg/mm^2$ as a preferable tension range at the time of drawing.

SUMMARY OF THE INVENTION

The inventors have studied the prior art and, as a result, have found problems as follows. Namely, in the case of an optical fiber whose core is doped with a high concentration of $GeO_2$ in order to attain a large refractive index difference between the core and cladding, such as dispersion compensating optical fiber and dispersion-shifted optical fiber, the increase in Rayleigh scattering loss caused by $GeO_2$ doping becomes problematic. For suppressing or reducing this increase in loss, the drawing tension may be increased. In this case, however, there is a possibility that the reliability of the optical fiber concerning its strength may lower as it breaks more often, for example.

In order to overcome such problems as mentioned above, it is an object of the present invention to provide an optical fiber comprising a structure which yields a low transmission loss even when doped with a high concentration of $GeO_2$ and is excellent in reliability for strength.

The optical fiber according to the present invention comprises a core region having a desirable refractive index profile, a cladding region provided on the outer periphery of the core region, and a hermetic coat provided on the outer periphery of the cladding region and mainly composed of carbon. Here, at least one of areas constituting the core region is doped with $GeO_2$ as a refractive index raising material, and the area having the maximum refractive index in the areas doped with $GeO_2$ is doped with $GeO_2$ of 8 mol % or more.

In a first embodiment of the optical fiber according to the present invention, the core region is set such that its maximum value ($\Delta max$) of relative refractive index difference in the core region with respect to silica glass non-intentionally doped with impurities (hereinafter referred to as pure silica glass) is 0.8% or more, in its diameter direction. The above-mentioned cladding region is made of pure silica glass.

In the optical fiber according to the first embodiment as mentioned above, since the surface of the cladding region is covered with the carbon coat, the resulting optical fiber is hard to break even when the tension at the time of drawing is increased in order to suppress or reduce transmission loss, whereby high reliability for strength is obtained.

If $\Delta max$ is made smaller (the doping amount of $GeO_2$ is lowered), on the other hand, then an optical fiber having a transmission loss equal to or less than that in the first embodiment can be obtained even at a lower drawing tension. If the value of $\Delta max$ with reference to pure silica glass is lowered alone, however, then the shape of refractive index profile also changes, thereby making it hard to yield desirable optical characteristics. Therefore, a second embodiment according to the present invention characteristically comprises a structure in which the cladding region is doped with fluorine, which is a refractive index lowering material, so as to substantially lower $\Delta max$ with reference to pure silica glass without changing the maximum relative refractive index difference of the core region with respect to the cladding region (totally lower the refractive index without changing the shape of refractive index profile itself). Here, the doping amount of fluorine with respect to the cladding region is preferably 0.5 wt % or more but 2 wt % or less.

In the optical fiber according to the first embodiment, in particular, the transmission loss $\alpha$ at a wavelength of 1.55 $\mu m$ and the maximum relative refractive index difference $\Delta max$ of the core region with respect to the cladding region (pure silica glass) satisfy the relationship of:

$$\alpha \leq 0.131 \times (\Delta max)^2 - 0.214 \times (\Delta max) + 0.284.$$

Also, when the transmission loss $\alpha$ is given by a quartic function including $(A \cdot \lambda^{-4} + B)$ with respect to a wavelength $\lambda$, the coefficient A in $(A \cdot \lambda^{-4} + B)$ is given by:

$$A \leq 0.446 \times (\Delta max)^2 - 0.484 \times (\Delta max) + 1.072$$

in the range where $\Delta max > 0.8\%$.

In the optical fiber according to the second embodiment in which the cladding region is doped with fluorine, on the other hand, the transmission loss $\alpha$ at a wavelength of 1.55 $\mu m$ and the maximum relative refractive index difference $\Delta max$ satisfy the relationship of:

$$\alpha \leq 0.0846 \times (\Delta max)^2 - 0.147 \times (\Delta max) + 0.262.$$

Also, when the transmission loss $\alpha$ is given by a quartic function including $(A \cdot \lambda^{-4} + B)$ with respect to a wavelength $\lambda$, the coefficient A in $(A \cdot \lambda^{-4} + B)$ is given by:

$$A \leq 0.374 \times (\Delta max)^2 - 0.369 \times (\Delta max) + 1.003$$

in the range where $\Delta max > 0.8\%$.

Further, in each of the above-mentioned first and second embodiments, the above-mentioned hermetic coat in the optical fiber according to the present invention has a film thickness of 10 nm or more but 100 nm or less, and a resistivity of $0.5 \times 10^{-3}$ $\Omega \cdot cm$ or more but $5 \times 10^{-3}$ $\Omega \cdot cm$ or less. Also, the optical fiber according to the present invention is applicable to various optical fibers such as, for example, any of an optical fiber having, as characteristics at a wavelength of 1.55 $\mu m$, a dispersion of $-5$ ps/nm/km or more but $+5$ ps/nm/km or less and an effective area of 50 $\mu m^2$ or more; an optical fiber having, as characteristics at a wavelength of 1.55 $\mu m$, a dispersion of $+6$ ps/nm/km or more but $+10$ ps/nm/km or less and an effective area of 50 $\mu m^2$ or more; an optical fiber having, as characteristics at a wavelength of 1.55 μm, a dispersion of −70 ps/nm/km or more but −15 ps/nm/km or less and an effective area of 20 μm² or more; and an optical fiber having, as characteristics at a wavelength of 1.55 μm, a dispersion of −200 ps/nm/km or more but −75 ps/nm/km or less and an effective area of 15 μm² or more.

The optical fiber according to the present invention is also applicable to a dispersion management fiber in which signs of dispersion value at a wavelength of 1.55 μm alternate in a traveling direction of light signals. Such an optical fiber is also obtained when the drawing rate at the time of drawing is altered at predetermined time intervals, or when an optical fiber preform in which the diameter of a core material is altered at predetermined spacing in the longitudinal direction is drawn.

In the making of the optical fiber according to the present invention, a first step of drawing an optical fiber from an optical fiber preform with a predetermined tension applied thereto, a second step of applying a hermetic coat mainly composed of carbon to the optical fiber obtained by the first step, and a third step of covering the optical fiber obtained by the second step with a resin material are carried out in succession.

In the case where the optical fiber according to the first embodiment is to be made, it is preferred that a tension of 13 kg/mm² or more, more preferably 17 kg/mm² or more but 28.5 kg/mm² or less, be applied to the optical fiber preform; whereby transmission loss is reduced in thus obtained optical fiber according to the first embodiment even when doped with a high concentration of $GeO_2$. Specifically, if the maximum doping amount of $GeO_2$ with respect to the core region is 15 mol %, for example, then the transmission loss of the resulting optical fiber becomes 0.3 dB/km or less. Also, the surface of the optical fiber obtained by the first step is provided with the carbon coat in the second step, and the carbon coat surface is covered with the resin material in the third step, so that the optical fiber is hard to break even though it is drawn at a high tension, whereby its reliability for strength improves. When the optical fiber according to the second embodiment is to be made, the tension applied to the optical fiber preform in the first step may be 13 kg/mm² or less.

The optical fiber according to the present invention manufactured as mentioned above has a fatigue parameter of 50 or more.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a view showing a cross-sectional structure in the first embodiment of the optical fiber according to the present invention, whereas

FIGS. 4A to 4N are various refractive index profiles employable as the refractive index profile of the optical fiber according to the present invention;

FIG. 9A is a refractive index profile of the first embodiment of the optical fiber according to the present invention, whereas

DETAILED DESCRIPTION OF THE PREFERRED EMBODIMENTS

In the following, individual embodiments of the present invention will be explained with reference to FIGS. 1, 2A to 4N, 5 to 8, 9A, 9B, and 10 to 14. In the explanation of the drawings, constituents identical to each other will be referred to with numerals identical to each other without repeating their overlapping descriptions.

Figure 1:
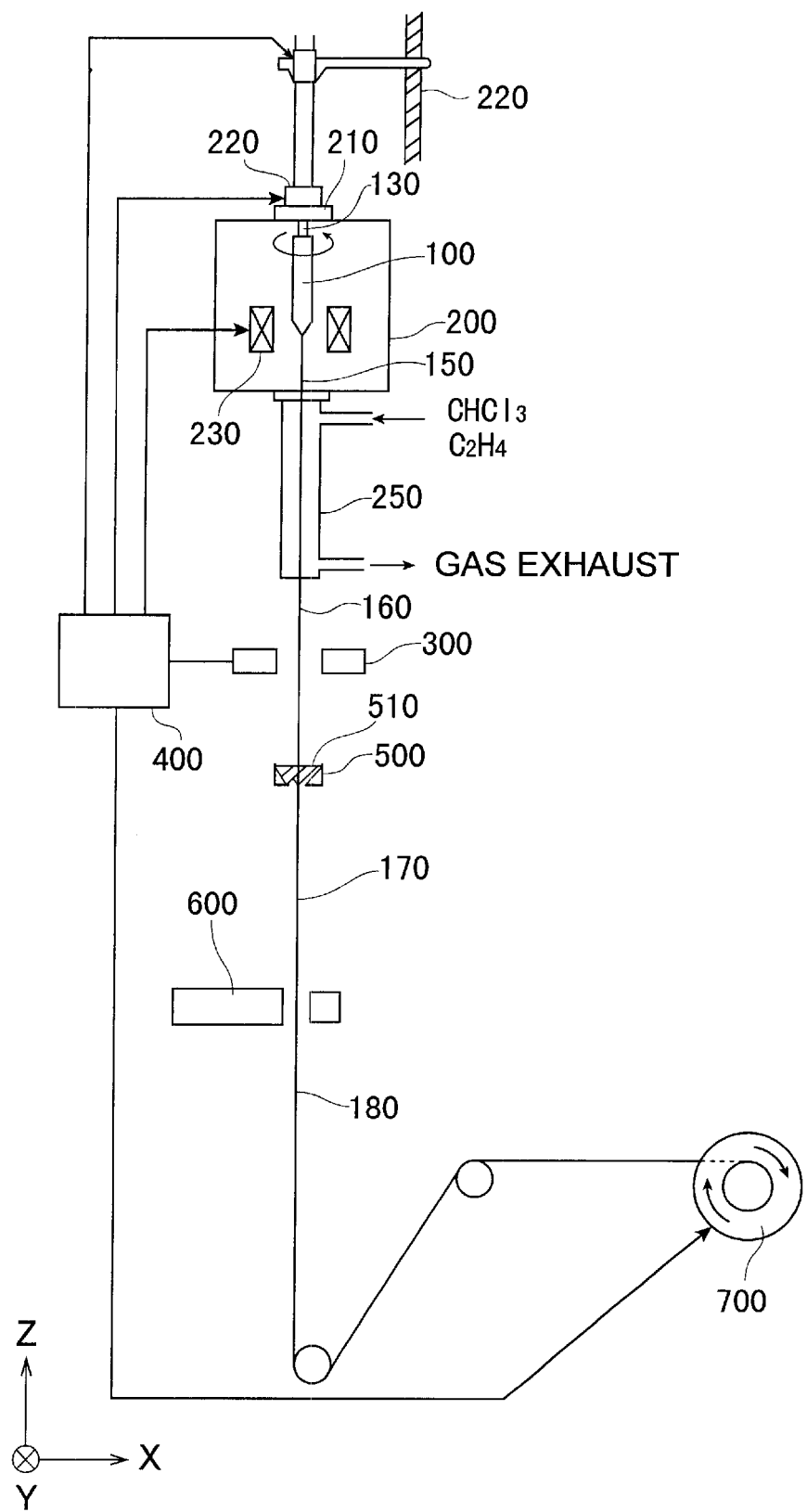
FIG. 1 is a view showing a first configuration of manufacturing apparatus for making an optical fiber according to the present invention.

FIG. 1 is a view showing a first configuration of manufacturing apparatus for making an optical fiber according to the present invention.

In the making of the optical fiber, as shown in FIG. 1, an optical fiber preform 100 to be drawn is initially prepared. This optical fiber preform 100 is mainly composed of silica glass and has a predetermined refractive index profile. The optical fiber preform 100 can be produced by vapor phase axial deposition method (VAD method), outside vapor deposition method (OVD method), inside vapor phase oxidation method (MCVD method), rod-in-tube method, or the like.

Subsequently, the optical fiber preform 100 is attached to a dummy rod 130, and a preform leader 220 moves the dummy rod 130 toward a heater 230, where by the optical fiber preform 100 attached to the dummy rod 130 is introduced into the heater 230. Then, as the lower end of the optical fiber preform 100 heated by the heater 230 is drawn, a bare fiber 150 is obtained (first step).

The bare fiber 150 obtained by drawing subsequently passes through a reaction tube 250 for forming a carbon coat. Supplied into the reaction tube 250 is a mixed gas of halogenated carbon (such as $CHCl_3$, $CCl_4$, or the like) and hydrocarbon (such as $C_2H_4$, $C_3H_8$, $C_6H_6$, or the like), in which halogenated carbon and hydrocarbon react with each other on the surface of the bare fiber 150, whereby the surface of the bare fiber 150 is covered with a hermetic coat (carbon coat) 151 mainly composed of carbon (second step).

The outside diameter of the carbon coated fiber 160 covered with the carbon coat 151 is measured by a laser outside diameter meter 300. According to the result of measurement obtained by the laser outside diameter meter 300, the heating temperature and drawing rate are controlled by a control system 400 such that the outside diameter of the carbon coated fiber 160 becomes a predetermined value (usually 125 $\mu$m).

The carbon coated fiber 160 having passed the laser outside diameter meter 300 further passes through a liquid resin 510 stored in a resin coating die 500, whereby the resin attaches to the surface of the carbon coated fiber 160 (thus yielding a resin-attached fiber 170). Subsequently, the resin-attached fiber 170 passes a UV lamp 600. Here, the resin attached to the surface of the carbon coated fiber 160 cures upon ultraviolet light irradiation from the UV lamp 600. As a consequence, an optical fiber 180 (optical cord) in which the surface of the carbon coated fiber 160 is covered with a resin coating 161 is obtained (third step), and the optical fiber 180 is taken up by a drum 700.

In the foregoing drawing step (first step), a tension of 13 $kg/mm^2$ or more, preferably 17 to 28.5 $kg/mm^2$, is applied to the bare fiber 150. Therefore, transmission loss is reduced in the optical fiber obtained by the above-mentioned manufacturing method even when doped with a high concentration of $GeO_2$.

The surface of the drawn bare fiber 150 is provided with the carbon coat 151 in the second step, and further is covered with the resin material in the third step. Therefore, even when residual stress occurs in the optical fiber 180 finally obtained after cooling, the carbon coat 151 prevents vapor and hydroxide ion from diffusing from the resin coating 161 into the bare fiber 150, thereby suppressing the growth of damages on the order of submicron in the bare fiber 150. Consequently, the optical fiber made by way of the foregoing individual steps is hard to break even though it is drawn at a high tension, thereby attaining a high reliability for strength.

Specifically, the core region of the optical fiber 180 made by the above-mentioned manufacturing method includes an area doped with $GeO_2$ of 8 mol % or more. In this optical fiber 180, the fatigue index (n value) indicative of the difficulty in breaking upon application of load is 50 or more.

Figure 2A:
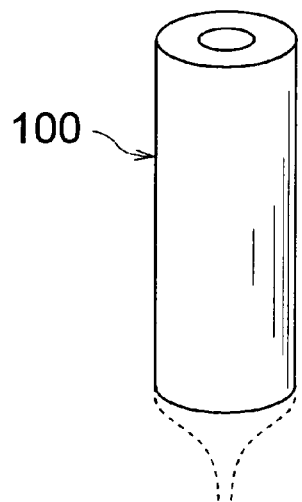
FIGS. 2A to 2C are views showing respective cross-sectional structures of the optical fiber at individual parts of the manufacturing apparatus shown in FIG. 1.
Figure 2B:
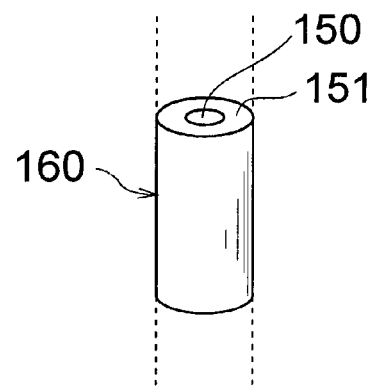
Figure 2C:
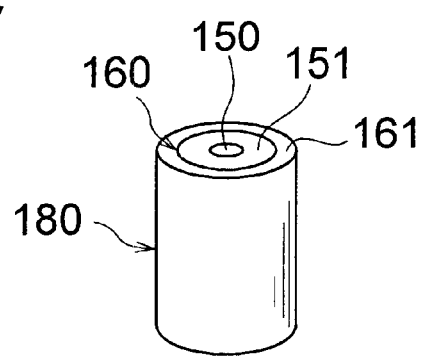

Here, FIGS. 2A, 2B, and 2C are views showing respective cross sections of the prepared optical fiber preform 100, the carbon coated fiber 160 in which the surface of the drawn bare fiber (including the core region and a cladding region) 150 is covered with the carbon coat 151, and the optical fiber 180 as the final product in which the surface of the carbon coated fiber 160 is provided with the resin coating 161.

First Embodiment

A first embodiment of the optical fiber according to the present invention will now be explained.

Figure 3A:
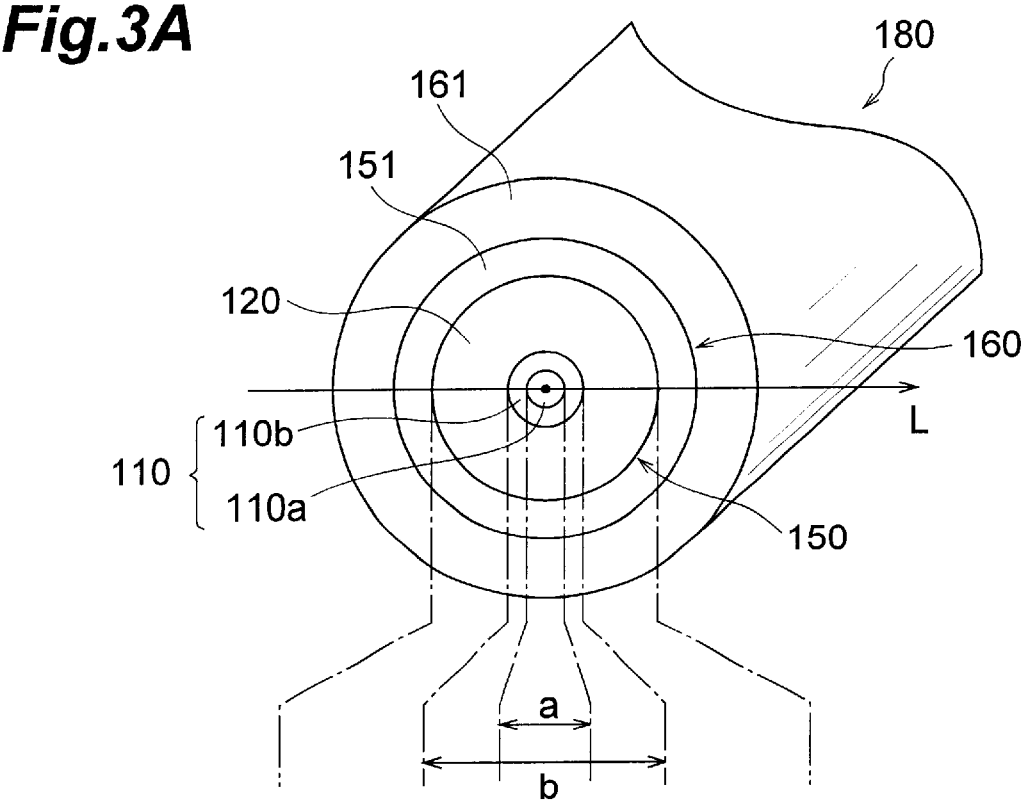
Figure 3B:
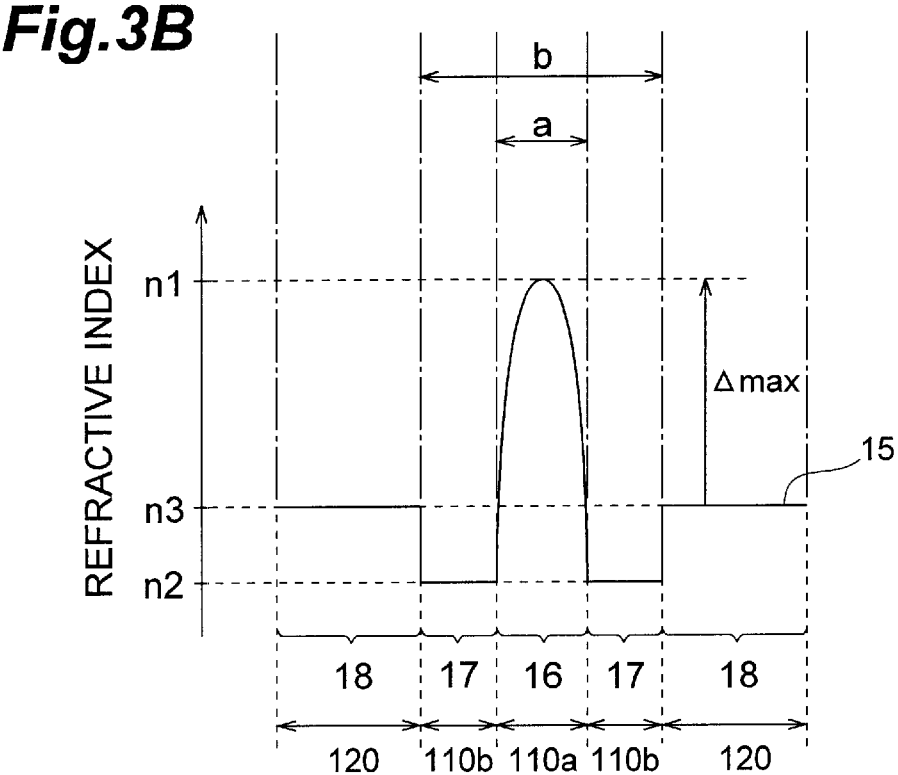
FIG. 3B is a refractive index profile thereof.

FIG. 3A is a view showing a typical cross-sectional structure of a dispersion compensating optical fiber as the optical fiber 180 according to the first embodiment, whereas FIG. 3B is a refractive index profile thereof.

As shown in FIG. 3A, the optical fiber 180 according to the first embodiment is constituted by a core region 110, a cladding region 120 provided on the outer periphery of the core region 110, a carbon coat 151 provided on the outer periphery of the cladding region 120, and a resin coating 161 provided on the outer periphery of the carbon coat 151. The core region 110 comprises a double structure comprising an inner area 110a, which is a silica glass area doped with 15 mol % of $GeO_2$, having an outside diameter a and a maximum refractive index n1, and an outer area 110b, which is a silica glass area doped with fluorine, having an outside diameter b (>a) and a refractive index n2. On the other hand, the cladding region 120 is constituted by silica glass which is non-intentionally doped with impurities (hereinafter referred to as pure silica glass), while having a refractive index n3. Also, the maximum refractive index difference $\Delta$ max (=(n1−n3)/n3) of the inner area 110a doped with $GeO_2$ with respect to the cladding region is 1.5%.

The above-mentioned core region 110 and cladding region 120 constitute the bare fiber 150; the bare fiber 150 and the carbon coat 151 constitute the carbon coated fiber 160; and the carbon coated fiber 160 and the resin coating 161 constitute the optical fiber 180 (optical cord).

FIG. 3B is a refractive index profile 15 of the optical fiber 180 shown in FIG. 3A, indicating the refractive index of each part on a line L. In this refractive index profile 15, areas 16, 17, and 18 indicate refractive indices of individual parts on the line L in the inner area 110a in the core region 110, the outer area 110b in the core region 110, and the cladding region 120, respectively. The structure of the core region 110 is not restricted to that shown in FIG. 3A. For example, it may employ structures having various refractive index profiles as shown in FIGS. 4A to 4N.

The optical fiber 180 according to the first embodiment was made as follows. Initially, a circular columnar inner core material made of silica glass doped with $GeO_2$, a circular tubular outer core material made of silica glass doped with fluorine, and a circular tubular cladding material made of pure silica glass, each made by the VAD method, were prepared. The outer core material was inserted inside the cladding material, the inner core material was subsequently inserted inside the outer core material, and they are unified by the rod-in-tube method. Thus unified member was employed as the optical fiber preform 100.

In the first step, the drawing rate for yielding the bare fiber 150 from the optical fiber preform 100 by drawing is set at 200 m/min. In the second step, the thickness of the carbon coat 151 covering the surface of the bare fiber 150 is set at 30 to 50 nm. In the third step, the outside diameter of the resin coating 161 covering the surface of the carbon fiber 160 is set at 250 $\mu$m.

Figure 5:
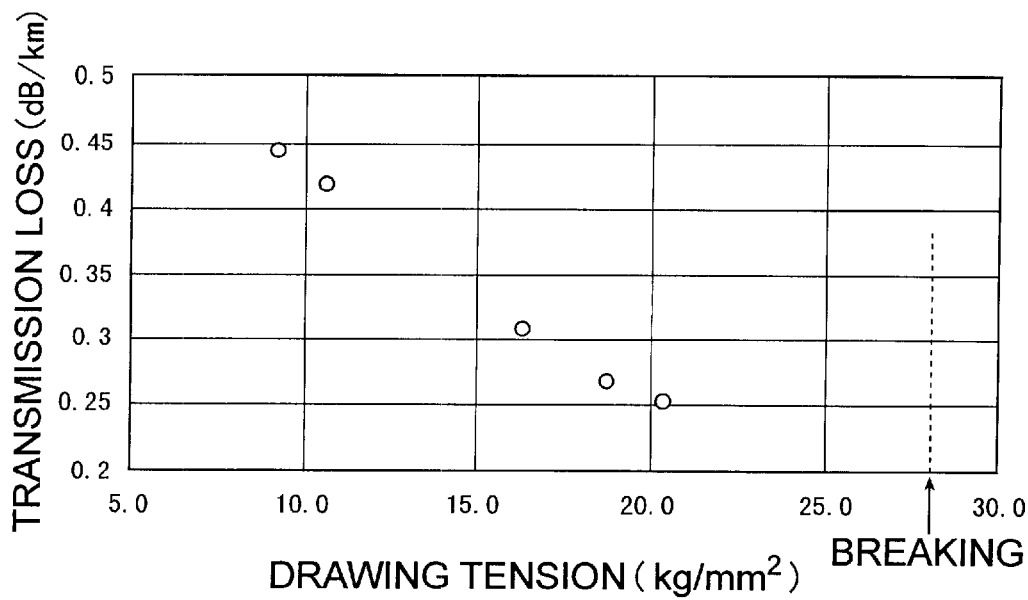
FIG. 5 is a graph showing relationships between the drawing tension (kg/mm²) and the transmission loss of the resulting optical fibers.
Figure 6:
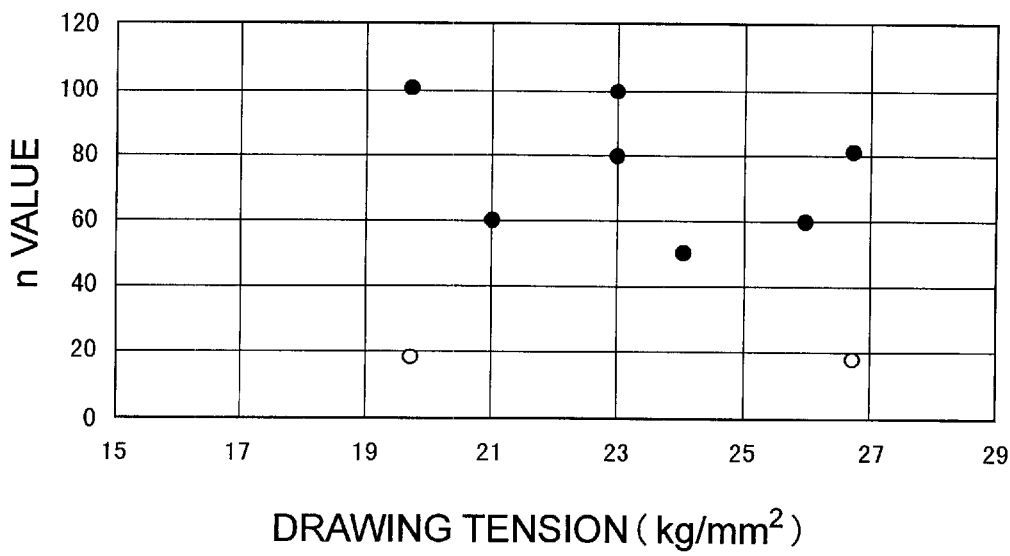
FIG. 6 is a graph showing relationships between the drawing tension (kg/mm²) and the fatigue index (n value) of the resulting optical fibers.

FIG. 5 is a graph showing the results of measurement of transmission loss at a wavelength of 1550 nm in individual optical fibers 180 obtained while the drawing tension ($kg/mm^2$) was successively changed under the above-mentioned conditions, whereas FIG. 6 is a graph showing the results of measurement of fatigue index (n value) in the individual optical fibers 180 obtained while the drawing tension ($kg/mm^2$) was successively changed under the above-mentioned conditions.

As can be seen from the graph shown in FIG. 5, the greater is the tension at the time of drawing, the lower becomes the transmission loss of the optical fiber 180 manufactured. For example, in order for the transmission loss at a wavelength of 1550 nm to be 0.35 dB/km or less, the tension at the time of drawing is preferably 13 kg/mm$^2$ or greater. Since the transmission loss at a wavelength of 1550 nm is desired to be 0.3 dB/km or less in practice, it is further preferred that the tension at the time of drawing be 17 kg/mm$^2$ or greater. For preventing breakage from occurring, however, the tension at the time of drawing is preferably 28.5 kg/mm$^2$ or less.

In the graph of FIG. 6, n values of the carbon coated fiber 160 measured at respective drawing tensions are plotted with black circles, whereas n values of the bare fiber 150 (without carbon coat) are plotted with white circles. As can be seen from the graph of FIG. 6, the fatigue index of the carbon coated fiber 160 (black circle) is 50 or greater, whereas the fatigue index of the bare fiber 150 (white circle) without the carbon coat 151 is less than 20. Thus, the optical fiber 180 can attain a favorable reliability for strength when the surface of the bare fiber 150 is covered with the carbon coat 151.

Second Embodiment

As in the foregoing, the optical fiber according to the first embodiment can suppress the increase in transmission loss and attain a favorable reliability for strength by enhancing the drawing tension in the manufacturing step thereof. However, if Δmax with reference to the refractive index of pure silica glass is lowered in the configuration of the first embodiment, then the transmission loss can be reduced even in the case where the same drawing tension is applied.

Lowering Δmax means a decrease in the amount of GeO$_2$ added into the core region. If the value of Δmax with reference to pure silica glass is simply lowered alone, on the other hand, then the shape of refractive index profile itself changes such that the maximum relative refractive index difference of the core region with respect to the cladding region becomes smaller and so forth, whereby desirable optical characteristics are harder to attain.

The second embodiment of the optical fiber according to the present invention is an optical fiber having a transmission loss equal to or less than that in the above-mentioned first embodiment even when the drawing tension at the time of making is made lower than that in the case of the first embodiment. Its refractive index profile comprises a configuration similar to that of the optical fiber according to the above-mentioned first embodiment (FIGS. 3A, 3B, and 4A to 4N), but differs therefrom in that the cladding region 120 is doped with fluorine. Therefore, the refractive index profile of the optical fiber according to the second embodiment can be realized by various shapes as shown in FIGS. 4A to 4N. Namely, the optical fiber according to the second embodiment characteristically has a structure in which the cladding region 120 is doped with fluorine, which is a refractive index lowering material, whereby Δmax with reference to pure silica glass is substantially lowered without changing the maximum relative refractive index difference of the core region with respect to the cladding region (thus totally lowering the refractive index without changing the shape of refractive index profile itself).

Figure 7:
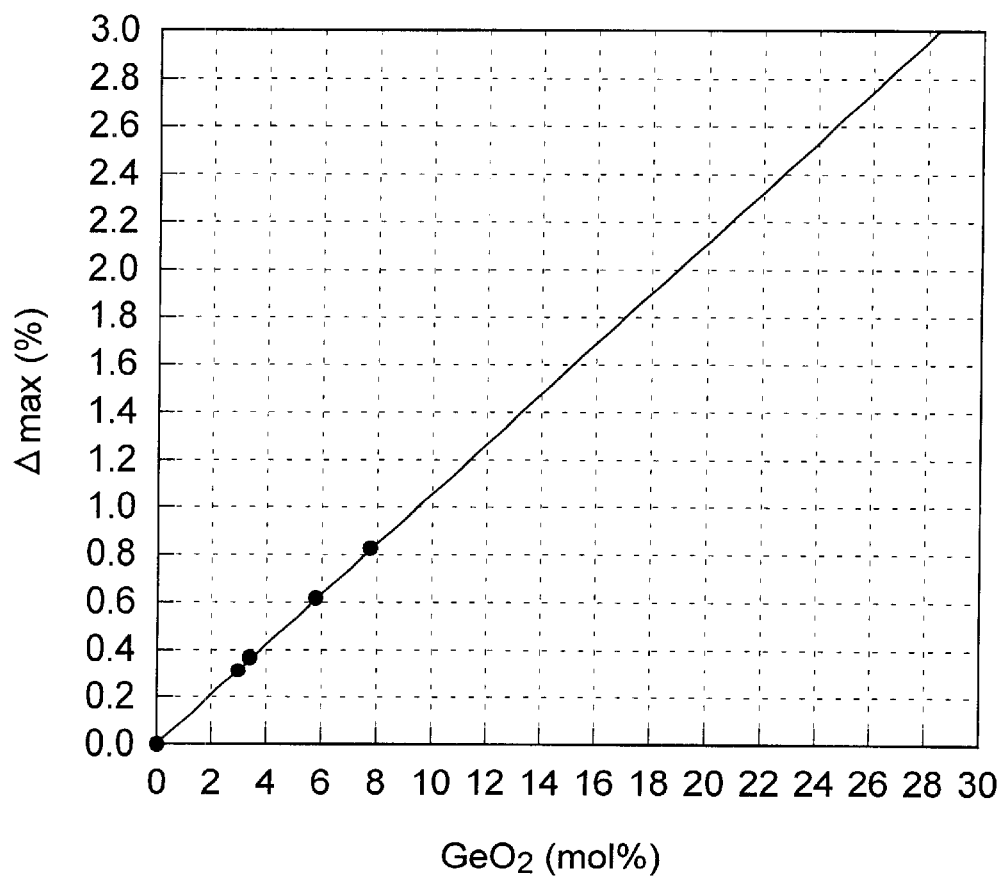
FIG. 7 is a graph showing a relationship between the $GeO_2$ concentration (mol %) in the core region and the maximum relative refractive index difference Δmax of the core region with respect to the cladding region.
Figure 8:
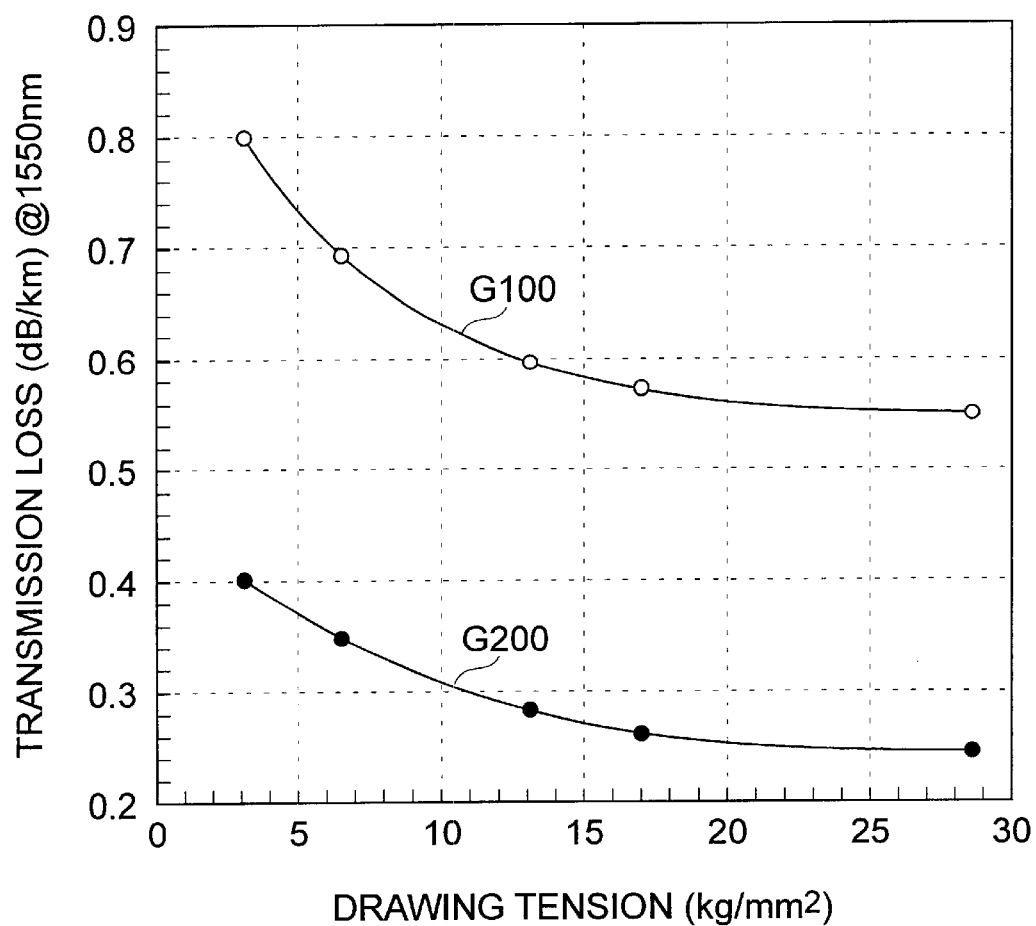
FIG. 8 is a graph showing relationships between the drawing tension (kg/mm²) and the transmission loss of the resulting optical fibers at a wavelength of 1550 nm.

In general, a proportional relationship such as one shown in FIG. 7 holds between the doping amount of GeO$_2$ and the relative refractive index difference of a glass material doped with GeO$_2$. Here, FIG. 7 is obtained from a Sellmeier's polynomial disclosed in S. Kobayashi, S. Shibata, N. Shibata, and T. Izawa, "Refractive-index dispersion of doped fused silica," IOOC '77. Also, the inventors have experimentally studied how the relationship between the drawing tension (kg/mm$^2$) at the time of making and the transmission loss (dB/km) changes in samples with different values of Δmax. FIG. 8 is a graph in which relationships between the drawing tension and the transmission loss at a wavelength of 1550 nm are measured in samples having different values of Δ max. The prepared samples are optical fibers according to the first embodiment having a refractive index profile shown in FIG. 9A, whereas the cladding region 120 is constituted by pure silica glass. In FIG. 8, G100 is a curve concerned with a sample in which the maximum relative refractive index difference Δmax in the core region 110 with respect to pure silica glass (cladding region 120) is set at 2.5%, whereas G200 is a curve concerned with a sample in which the maximum relative refractive index difference Δmax in the core region 110 with respect to pure silica glass (cladding region 120) is set at 1.5%.

As can be seen from the curves G100, G200 in FIG. 8, each of these cases tends to lower the transmission loss at a wavelength of 1550 nm as the drawing tension increases as in the graph shown in FIG. 5. It is also seen that, even at the same drawing tension, the sample with a smaller value of Δmax can yield a lower transmission loss. This result of measurement shows that, in view of the relationship in FIG. 7, a further decrease in transmission loss can be realized if the doping amount of GeO$_2$ is lowered (Δmax with reference to the refractive index of pure silica glass is reduced).

According to the foregoing findings, the optical fiber according to the second embodiment dopes the cladding region 120 with fluorine, so as to totally lower the refractive index, thereby maintaining the shape of refractive index profile, while comprising a structure in which Δmax with reference to the refractive index of pure silica glass is made lower than that in the first embodiment, i.e., structure in which the maximum doping amount of GeO$_2$ added into the core region 110 is smaller than that in the first embodiment. Preferably, the amount of fluorine added to the cladding region is 0.5 wt % or more but 2 wt % or less.

Figure 9A:
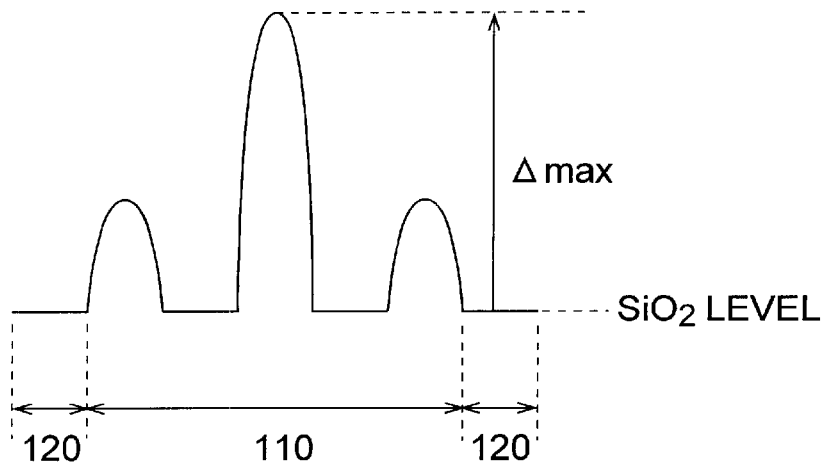
Figure 9B:
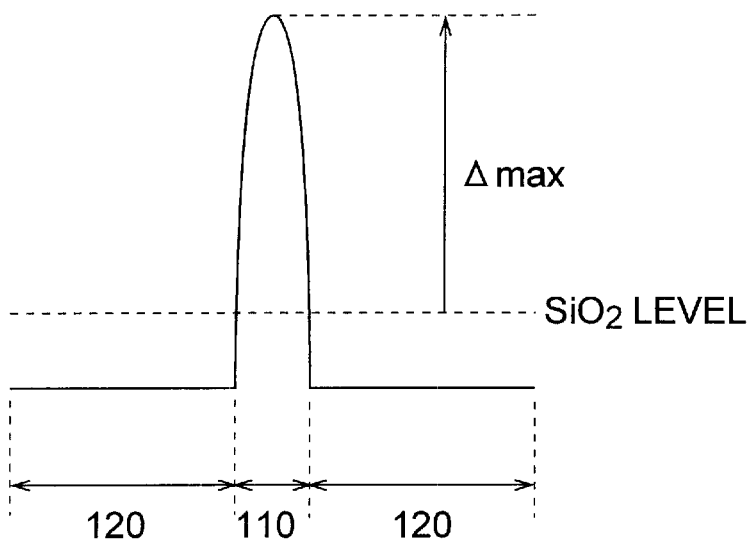
FIG. 9B is a refractive index profile of a modified example of the first embodiment.

Concerning each of the optical fibers according to the first and second embodiments, the relationship between the maximum relative refractive index difference Δmax of the core region with respect to pure silica glass (silica glass non-intentionally doped with impurities) and the transmission loss will now be explained. The samples of the first and second embodiments prepared for the following explanations have the refractive index profiles shown in FIGS. 9A and 9B, respectively. Namely, FIG. 9A is a refractive index profile of the sample prepared as the optical fiber according to the first embodiment, comprising a core region 110 of a triple structure having two regions doped with GeO$_2$, and a cladding region 120 made of pure silica glass. FIG. 9B is a refractive index profile of the sample prepared as the optical fiber according to the second embodiment, comprising a single core region 110 doped with GeO$_2$, and a cladding region 120 doped with fluorine.

Figure 10:
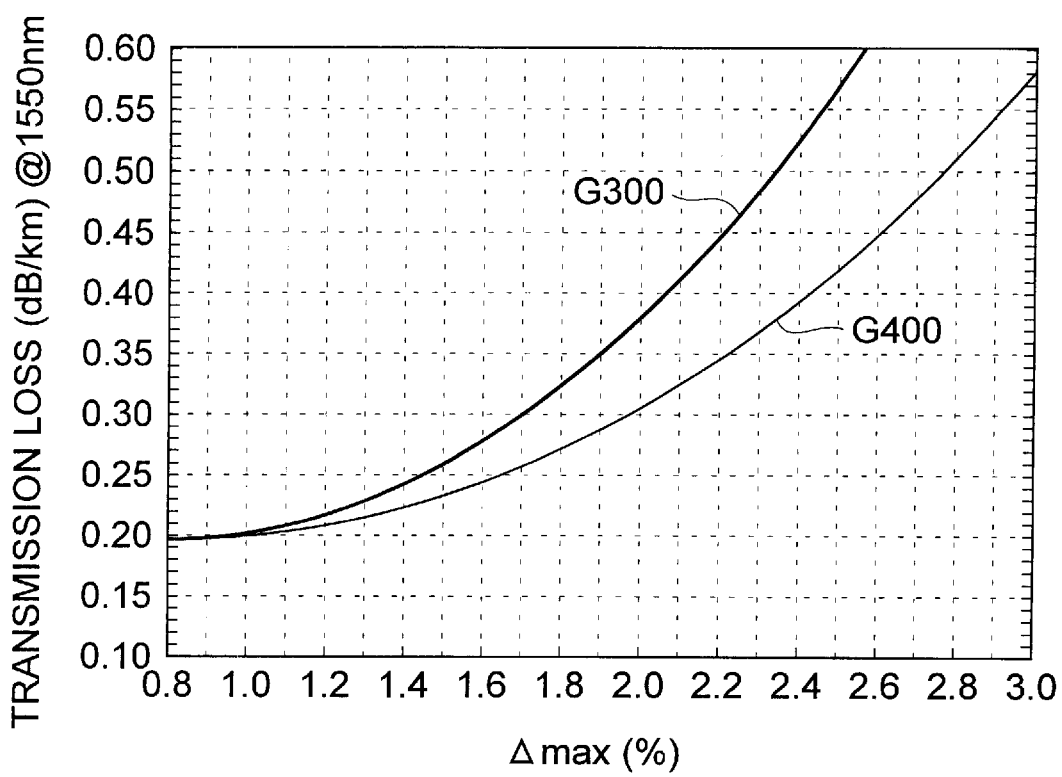
FIG. 10 is a graph showing relationships between the transmission loss of optical fibers at a wavelength of 1550 nm and the maximum relative refractive index difference Δ max of the core region with respect to the cladding region.

The curve G300 shown in FIG. 10 indicates the relationship between Δmax (%) and the transmission loss (dB/km) at a wavelength of 1550 nm in the sample of optical fiber according to the first embodiment (whose cladding region 120 is pure silica glass) having the refractive index profile shown in FIG. 9A, whereas the curve G400 indicates the relationship between Δmax (%) and the transmission loss (dB/km) at a wavelength of 1550 nm in the sample of optical fiber according to the second embodiment (whose cladding region 120 is silica glass doped with 1 wt % of fluorine) having the refractive index profile shown in FIG. 9B. In each of the samples, the drawing tension at the time of making is 13 kg/mm$^2$.

In FIG. 10, letting α be the transmission loss, the curve G300 can be approximated by the following expression (1):

$$\alpha = 0.131 \times (\Delta max)^2 - 0.214 \times (\Delta max) + 0.284. \quad (1)$$

On the other hand, letting α be the transmission loss, the curve G400 can be approximated by the following expression (2):

$$\alpha = 0.0846 \times (\Delta max)^2 - 0.147 \times (\Delta max) + 0.262. \quad (2)$$

In view of the foregoing, the first embodiment of the optical fiber according to the present invention is characterized by the relationship between transmission loss and Δmax represented by the above-mentioned expression (1). Also, the second embodiment of the optical fiber according to the present invention is characterized by the relationship between transmission loss and Δmax represented by the above-mentioned expression (2).

Figure 11:
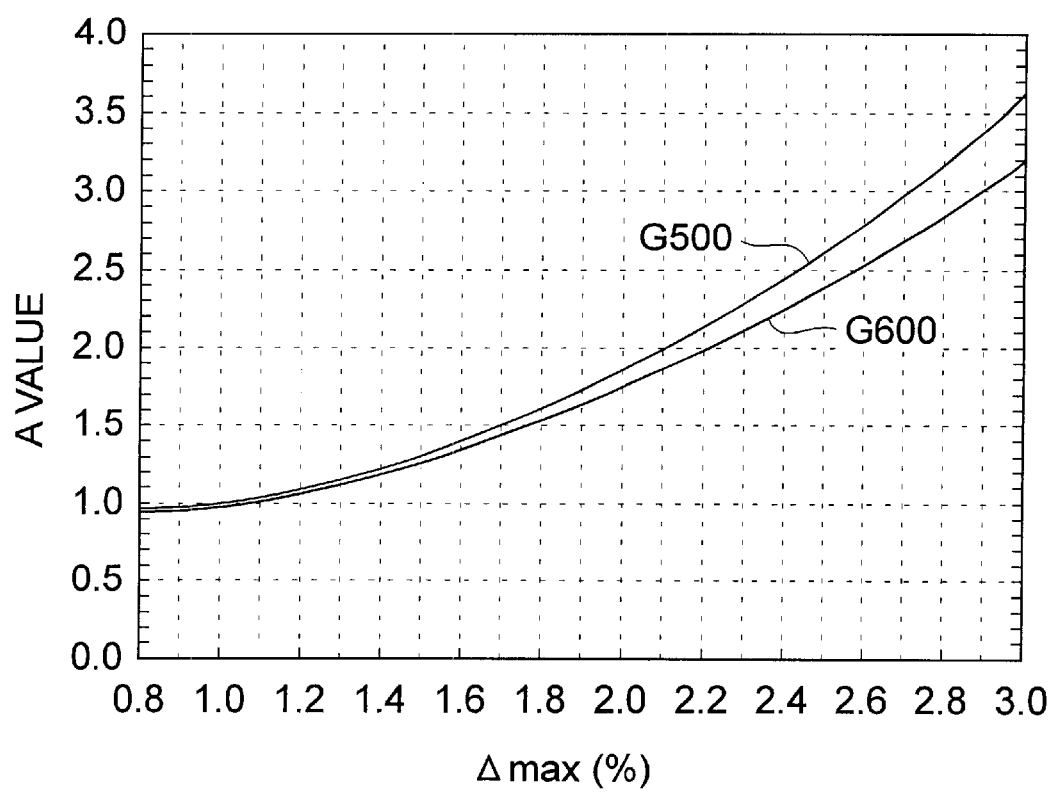
FIG. 11 is a graph showing relationships between the maximum relative refractive index difference Δmax of the core region with respect to the cladding region and the coefficient A of the quartic function indicating the relationship between the transmission loss α and the wavelength λ.

The curve indicating the wavelength dependence of transmission loss in a generally known optical fiber is similar to the shape of a quartic function, for example, such as (A·λ$^{-4}$+B). Therefore, the inventors have studied the wavelength dependence of transmission loss in the first and second embodiments of the optical fiber according to the present invention. FIG. 11 shows relationships between Δmax and the coefficient A in (A·λ$^{-4}$+B) in the range where Δmax>0.8%. The curve G500 shown in FIG. 11 indicates the relationship between Δmax (%) and the parameter A ((dB·μm$^4$)/km) in the sample of optical fiber according to the first embodiment (whose cladding region 120 is pure silica glass) having the refractive index profile shown in FIG. 9A, whereas the curve G600 indicates the relationship between Δmax (%) and the parameter A ((dB·μm$^4$)/km) in the sample of optical fiber according to the second embodiment (whose cladding region 120 is silica glass doped with 1 wt % of fluorine) having the refractive index profile shown in FIG. 9B.

In FIG. 11, the curve G500 can be approximated by the following expression (3):

$$A = 0.446 \times (\Delta max)^2 - 0.484 \times (\Delta max) + 1.072 \quad (3)$$

in the range where Δmax≧0.8%.

On the other hand, the curve G600 can be approximated by the following expression (4):

$$A = 0.374 \times (\Delta max)^2 - 0.369 \times (\Delta max) + 1.003 \quad (4)$$

in the range where Δmax≧0.8%.

In view of the foregoing, the first embodiment of the optical fiber according to the present invention is also characterized by the relationship between parameter A and Δmax represented by the above-mentioned expression (3). Similarly, the second embodiment of the optical fiber according to the present invention is characterized by the relationship between parameter A and Δmax represented by the above-mentioned expression (4).

The optical fibers according to the first and second embodiments explained in the foregoing are also obtained by rocking drawing as follows in order to improve polarization mode dispersion.

Figure 12:
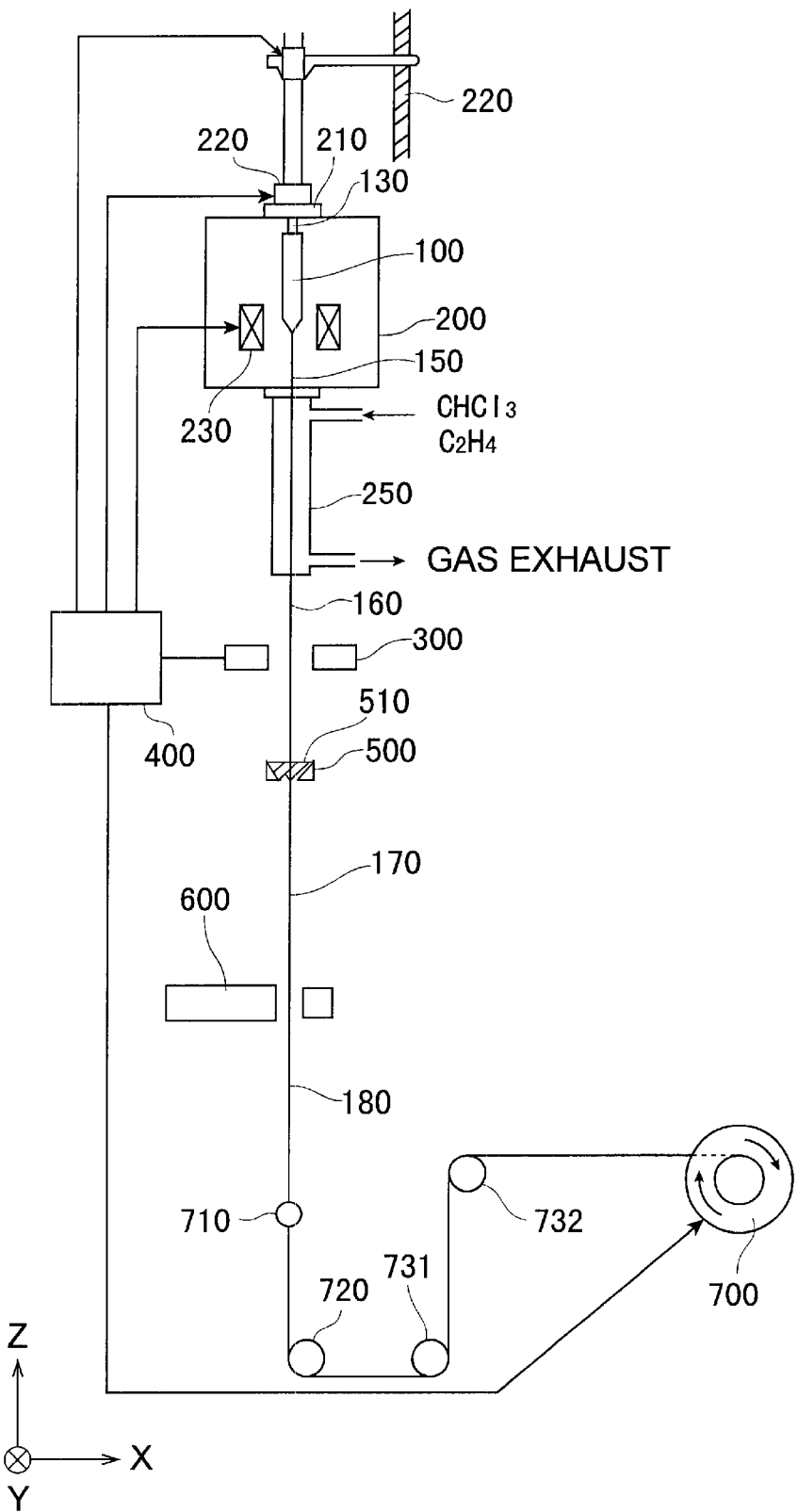
FIG. 12 is a view showing a second configuration of manufacturing apparatus for making the optical fiber according to the present invention.

Namely, FIG. 12 is a view showing a second configuration of manufacturing apparatus for making the optical fiber according to the present invention.

The manufacturing apparatus of FIG. 12 is an apparatus for yielding an optical fiber by rocking drawing. In the rocking drawing, the optical fiber 180 having passed the UV lamp 600 initially passes between a pair of guide rollers 710 for suppressing the passive movement of optical fiber, which freely rotate without hindering the progress of the optical fiber 180. Subsequently, the optical fiber 180 is successively guided by a rocking guide roller 720, a first fixed guide roller 731 arranged at a stage next to the rocking guide roller 720, and a second fixed guide roller 732 arranged at a stage next to the first fixed guide roller 731. The optical fiber 180 having successively passed the rocking guide roller 720, first fixed guide roller 731, and second fixed guide roller 732 is taken up by a drum 700.

Here, the pair of guide rollers 710 for suppressing the passive movement of optical fiber are arranged at a position separated from the rocking guide roller 720 in the directly upward direction (along the depicted Z axis) by a distance of 100 mm, whereas the gap between the pair of guide rollers 710 is 2 mm. The rocking guide roller 720 has a roller outside diameter of 150 mm, a roller width of 30 mm, and a roller surface made of aluminum which is the material of the roller itself; and is installed such that its axis of rotation can pivot about the depicted Z axis at a frequency of 100 rpm (to an angle of −θ from the Y axis orthogonal to the X axis indicating the direction by which the optical fiber 180 is drawn and to an angle of +θ from the Y axis). While the first fixed guide roller 731 is installed at a position separated from the rocking guide roller 720 in a directly sidewise direction (on the depicted X-Y plane where the guide roller 720 is installed) by a distance of 250 mm and has a roller outside diameter of 150 mm and a roller width of 30 mm as with the rocking guide roller 720, its axis of rotation is fixed, and the center part of the roller surface is provided with a V-shaped narrow groove as means for inhibiting the rotation of optical fiber. The combination of the pair of guide rollers 710 for suppressing the passive movement of optical fiber, rocking guide roller 720, and first fixed guide roller 731 arranged the foregoing condition adds a predetermined twist to the optical fiber 180 effectively, i.e., at a high efficiency with respect to the rocking rate of the rocking guide roller 720.

Figure 13:
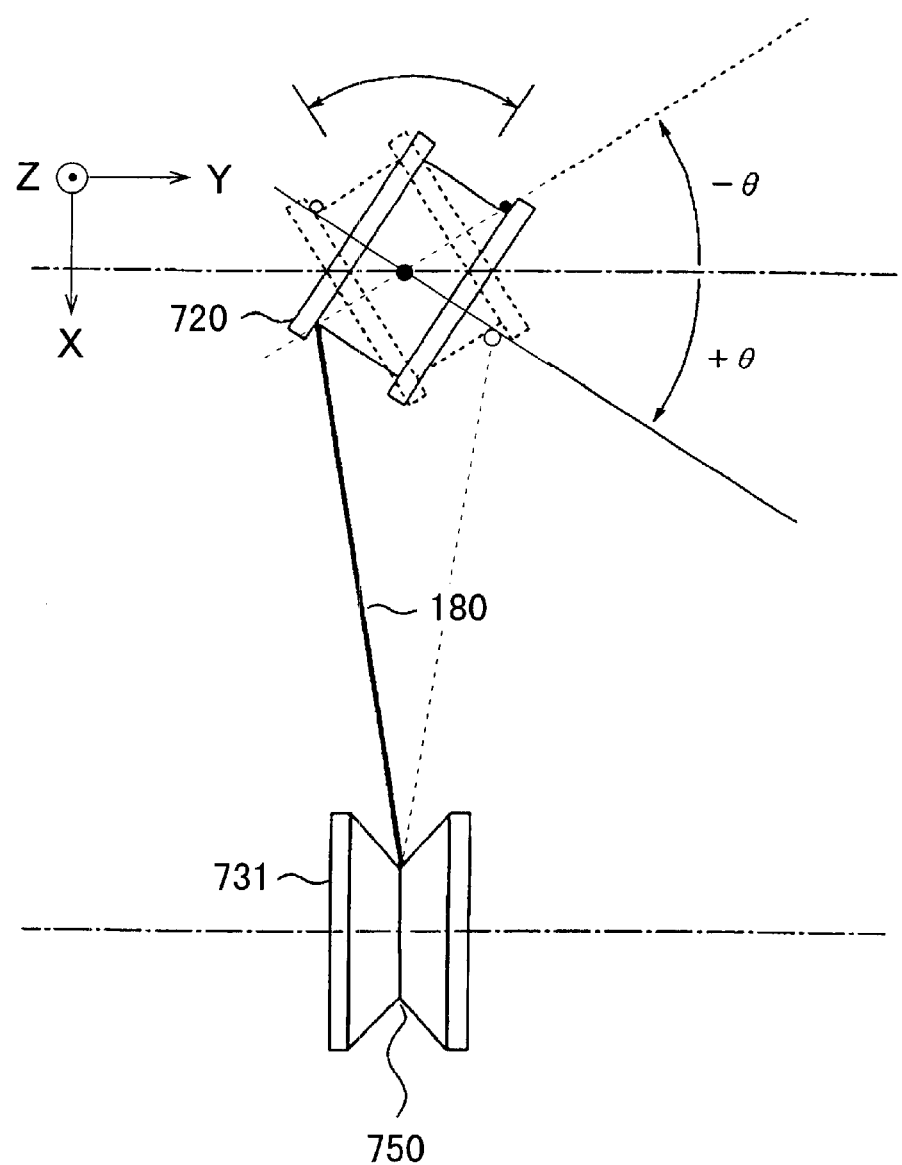
FIG. 13 is a view for explaining a spatial positional relationship between a rocking guide roller and a first fixed guide roller.
Figure 14:
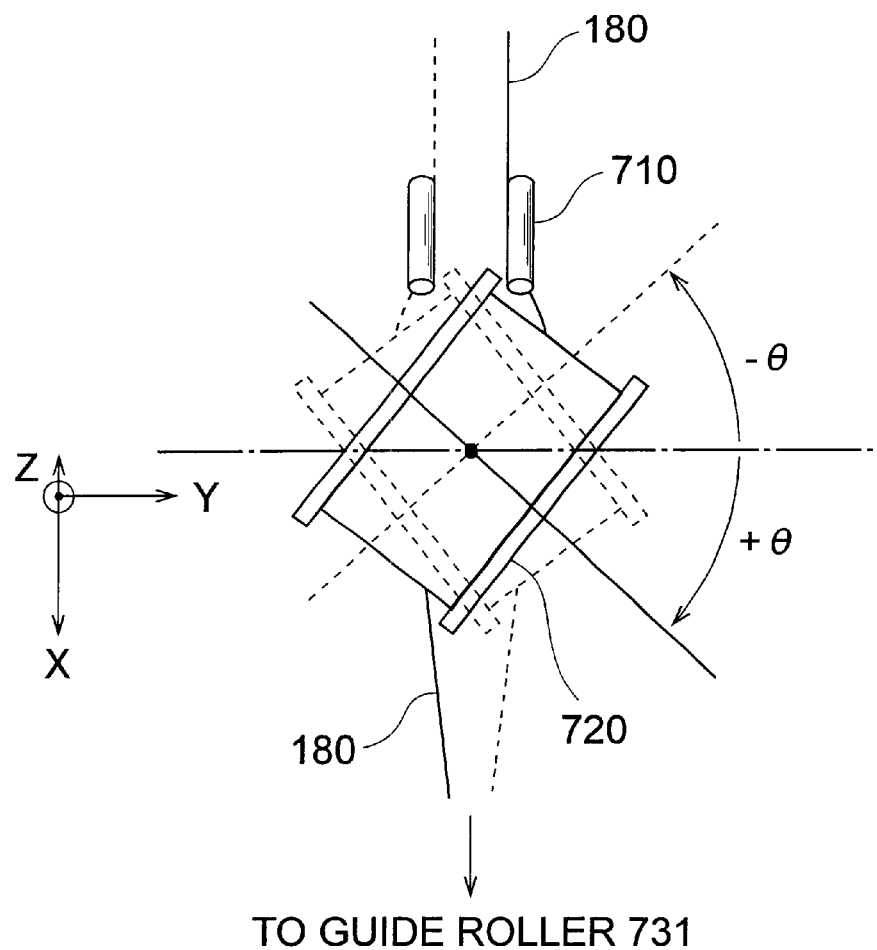
FIG. 14 is a view for explaining a spatial positional relationship between a pair of guide rollers for suppressing the passive movement of optical fiber and a rocking guide roller.

A method of effectively adding a predetermined twist to the optical fiber 180 will now be explained with reference to FIGS. 13 and 14. Here, FIG. 13 is a view of the rocking guide roller 720 and first fixed guide roller 731 as seen from the side of a reaction furnace 250. Also, FIG. 14 is a view of the pair of guide rollers 710 for suppressing the passive movement of optical fiber and rocking guide roller 720 as seen from the side of the reaction furnace 250. For easier viewing of the spatial positional relationship between the pair of guide rollers 710 and rocking guide roller 720, FIG. 14 is a view of the rollers 710, 720 as seen from a slightly slanting direction.

When the rocking guide roller 720 rotates about the Z axis from the Y axis as shown in FIG. 13, a force directed orthogonal to the Z axis is applied to the optical fiber 180 due to this rotation, whereby the optical fiber 180 rotates on the roller surface of the rocking guide roller 720. Upon this rotation, a twist is given to the optical fiber 180. Subsequently, the rocking guide roller 720 inversely rotates about the Z axis from the Y axis by an angle of −θ. Thus, as indicated by the depicted arrows, a symmetrical movement in which the rocking guide roller 720 pivots about the Z axis from an angle of +θ to an angle of −θ is repeated, whereby clockwise and counterclockwise twists are alternately applied to the optical fiber 180 with respect to its traveling direction.

Here, since the first fixed guide roller 731 at the stage next to the rocking guide roller 720 is installed directly aside the rocking guide roller 720 with the same roller outside diameter, the length by which the optical fiber 180 is in contact with the roller surface of the rocking guide roller 720 substantially equals the length of the roller circumference corresponding to a center angle of 90° in the rocking guide roller 720. Namely, the optical fiber 180 is in contact with the rocking guide roller 720 from one roller side face to the bottom face thereof, and is liberated therefrom at the lowest bottom portion thereof. Thus inhibited is a situation where the rotation of the optical fiber 180 on one side face is impeded by the rotation of the optical fiber 180 occurring on the other side face, which causes the optical fiber 180 to slide. Therefore, as the optical fiber 180 rotates on one side face of the rocking guide roller 720, a twist is applied to the optical fiber 180 at a high efficiency with respect to the rocking rate of the rocking guide roller 720.

Also, the center part of the roller surface of the first fixed guide roller 731 is provided with a V-shaped narrow groove 750 as means for inhibiting the rotation of optical fiber, into which the optical fiber 180 to be guided by the first fixed guide roller 731 is inserted. Thus inhibited is a situation where the optical fiber 180 rotates on the roller surface of the first fixed guide roller 731, which hinders the optical fiber 180 from rotating in the rocking guide roller 720 for attaining a twist. Therefore, as the V-shaped narrow groove 750 inhibits the optical fiber 180 from rotating on the roller surface of the first fixed guide roller 731, a twist is applied to the optical fiber 180 at a high efficiency with respect to the rocking rate of the rocking guide roller 720.

Then, as shown in FIG. 14, when the optical fiber 180 rotates on the roller surface of the rocking guide roller 720 as the latter rotates about the Z axis in FIG. 12 from the Y axis by an angle of $+\theta$, the part of fiber located on the side of the reaction furnace 250 immediately upstream the rocking guide roller 720 passively moves in the rocking direction of the rocking guide roller 720 as the optical fiber 180 rotates. If the passive movement of the optical fiber 180 exceeds a predetermined range, then it causes the amount of twist applied to the optical fiber 180 to decrease and the part of optical fiber coated with the resin coating 161 to become uneven. Since a pair of guide rollers 710 are installed directly above the rocking guide roller 720 (at a position close thereto along the Z axis), however, the optical fiber 180 comes into contact with one of the pair of guide rollers 710 if the passive movement of the optical fiber 180 becomes a predetermined level or greater, whereby the optical fiber 180 is inhibited from passively moving more. Therefore, as the pair of guide rollers 710 suppress the passive movement of the optical fiber 180, the decrease in the amount of twist applied to the optical fiber 180 and the unevenness in the part of optical fiber coated with the resin coating 161 are effectively suppressed.

Thus, since the pair of guide rollers for suppressing the passive movement of optical fiber, the rocking guide roller 720, and the first fixed guide roller 731 are combined, the second configuration of manufacturing apparatus shown in FIG. 12 functions such that the rocking guide roller 720 alternately applies clockwise and counterclockwise twists to the optical fiber 180 by rotating the latter on the roller surface upon its rocking movement, while the pair of guide rollers 710 for suppressing the passive movement of optical fiber and the first fixed guide roller 731 provided with means for inhibiting the rotation of optical fiber assist the optical fiber 180 to rotate smoothly on the roller surface of the rocking guide roller 720. As a consequence, the optical fiber 180 can be provided with twists efficiently with respect to the rocking rate of the rocking guide roller 720.

In the manufacturing apparatus of FIG. 12, the passive movement of the optical fiber 180 is suppressed by the pair of guide rollers 710 for suppressing the passive movement of optical fiber when the optical fiber 180 is rotated on the roller surface of the rocking guide roller 720, whereby the part of optical fiber coated with the resin coating 161 is effectively prevented from becoming uneven.

As a consequence, the optical fiber 180 made by the foregoing manufacturing apparatus comprises the core region 110 and the cladding region 120 covering the core region 110, while clockwise and counterclockwise twists have alternately been applied thereto, whereby its polarization mode dispersion is suppressed in the elongated optical fiber as a whole in a manner equivalent to the case where the core region 110 and the cladding region 120 have truly concentric circular cross sections even if they are not. Also, since the part of optical fiber coated with the resin coating 161 is kept from becoming uneven, the optical fiber 180 is prevented from yielding asymmetrical stress distributions in the cross section of this part, whereby the strength of the optical fiber 180 upon cabling can be improved.

Though the rocking movement of the rocking guide roller 720 in the foregoing manufacturing apparatus capable of rocking drawing is a symmetrical reciprocation from an angle of $-\theta$ to an angle of $+\theta$ as shown in FIG. 13, it is not restricted thereto. For example, it may be an asymmetric movement of rocking from an angle of 0 to an angle of $+\theta$. In this case, twists are intermittently applied to the optical fiber 180. Alternatively, it may be a symmetrical reciprocation of rocking in the direction of axis of rotation of the rocking guide roller 720. In this case, as with the movement explained above, the optical fiber 180 is alternately provided with clockwise and counterclockwise twists. Though the roller surface of the first fixed guide roller 731 is formed with the V-shaped narrow groove 750 as means for inhibiting the rotation of optical fiber in the manufacturing apparatus of FIG. 12, a U-shaped narrow groove or depressed narrow groove yields similar effects.

As in the foregoing, since the present invention comprises a structure in which the outer periphery of a bare fiber is provided with a carbon coat, it becomes an optical fiber having a favorable transmission loss while being kept from breaking even when the drawing tension at the time of making is set to 13 kg/mm$^2$ or greater.

Also, when the cladding region is doped with fluorine, so as to totally lower the refractive index without changing the shape of refractive index profile, thereby keeping a low level of $\Delta$max with reference to the refractive index of pure silica glass, an optical fiber having a low transmission loss is obtained without increasing the drawing tension at the time of making.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 7-072372 filed on Mar. 6, 1995, No. 7-168298 filed on Jun. 9, 1995, No. 8-075343 on Mar. 5, 1996, No. 8-3129878 filed on Nov. 9, 1996 are hereby incorporated by reference.

What is claimed is:

1. An optical fiber comprising:
   a core region whose maximum value $\Delta$max of relative refractive index difference with respect to silica glass non-intentionally doped with impurities is 0.8% or more, in its diameter direction;
   a cladding region provided on the outer periphery of said core region and comprised of silica glass non-intentionally doped with impurities; and a hermetic coat provided on the outer periphery of said cladding region and mainly composed of carbon;

wherein transmission loss a at a wavelength of 1.55 μm and said maximum value Δmax satisfy the relationship of:

$$\alpha \leq 0.131 \times (\Delta max)^2 - 0.214 \times (\Delta max) + 0.284.$$

2. An optical fiber according to claim 1, wherein, when the transmission loss α is given by a quartic function including $(A \cdot \lambda^{-4} + B)$ with respect to a wavelength λ, the coefficient A in $(A \cdot \lambda^{-4} + B)$ is given by:

$$A \leq 0.446 \times (\Delta max)^2 - 0.484 \times (\Delta max) + 1.072$$

in a range where Δmax>0.8%.

3. An optical fiber according to claim 1, wherein said hermetic coat has a film thickness of 10 nm to 100 nm, and a resistivity of $0.5 \times 10^{-3}$ Ω·cm or more but $5 \times 10^{-3}$ Ω·cm or less.

4. An optical fiber according to claim 1, wherein said optical fiber has, as characteristics at a wavelength of 1.55 μm, a dispersion of −5 ps/nm/km or more but +5 ps/nm/km or less and an effective area of 50 μm² or more.

5. An optical fiber according to claim 1, wherein said optical fiber has, as characteristics at a wavelength of 1.55 μm, a dispersion of +6 ps/nm/km or more but +10 ps/nm/km or less and an effective area of 50 μm² or more.

6. An optical fiber according to claim 1, wherein said optical fiber has, as characteristics at a wavelength of 1.55 μm, a dispersion of −70 ps/nm/km or more but −15 ps/nm/km or less and an effective area of 20 μm² or more.

7. An optical fiber according to claim 1, wherein said optical fiber has, as characteristics at a wavelength of 1.55 μm, a dispersion of −200 ps/nm/km or more but −75 ps/nm/km or less and an effective area of 15 μm² or more.

8. An optical fiber according to claim 1, wherein signs of dispersion value at a wavelength of 1.55 μm alternate in a traveling direction of light signals.

9. An optical fiber comprising:

a core region whose maximum value Δmax of relative refractive index difference with respect to silica glass non-intentionally doped with impurities is 0.8% or more, in its diameter direction;

a cladding region provided on the outer periphery of said core region and comprised of silica glass at least doped with a predetermined amount of fluorine; and a hermetic coat provided on the outer periphery of said cladding region and mainly composed of carbon;

wherein transmission loss α at a wavelength of 1.55 μm and said maximum value Δmax satisfy the relationship of:

$$\alpha \leq 0.0846 \times (\Delta max)^2 - 0.147 \times (\Delta max) + 0.262.$$

10. An optical fiber according to claim 9, wherein, when the transmission loss α is given by a quartic function including $(A \cdot \lambda^{-4} + B)$ with respect to a wavelength λ, the coefficient A in $(A \cdot \lambda^{-4} + B)$ is given by:

$$A \leq 0.374 \times (\Delta max)^2 - 0.369 \times (\Delta max) + 1.003$$

in a range where Δmax>0.8%.

11. An optical fiber according to claim 9, wherein an outermost area in said cladding region has a fluorine-doping amount of 0.5 wt % or more but 2 wt % or less.

12. An optical fiber according to claim 9, wherein said hermetic coat has a film thickness of 10 nm to 100 nm, and a resistivity of $0.5 \times 10^{-3}$ Ω·cm or more but $5 \times 10^{-3}$ Ω·cm or less.

13. An optical fiber according to claim 9, wherein said optical fiber has, as characteristics at a wavelength of 1.55 μm, a dispersion of −5 ps/nm/km or more but +5 ps/nm/km or less and an effective area of 50 μm² or more.

14. An optical fiber according to claim 9, wherein said optical fiber has, as characteristics at a wavelength of 1.55 μm, a dispersion of +6 ps/nm/km or more but +10 ps/nm/km or less and an effective area of 50 μm² or more.

15. An optical fiber according to claim 9, wherein said optical fiber has, as characteristics at a wavelength of 1.55 μm, a dispersion of −70 ps/nm/km or more but −15 ps/nm/km or less and an effective area of 20 μm² or more.

16. An optical fiber according to claim 9, wherein said optical fiber has, as characteristics at a wavelength of 1.55 μm, a dispersion of −200 ps/nm/km or more but −75 ps/nm/km or less and an effective area of 15 μm² or more.

17. An optical fiber according to claim 9 wherein signs of dispersion value at a wavelength of 1.55 μm alternate in a traveling direction of light signals.

* * * * *